United States Patent
Walker et al.

(10) Patent No.: US 10,662,373 B2
(45) Date of Patent: *May 26, 2020

(54) SCINTILLATING MATERIAL COMPOSITION TO PROVIDE HIGH LIGHT OUTPUT

(71) Applicant: NANOPTICS, INCORPORATED, Gainesville, FL (US)

(72) Inventors: James K. Walker, Gainesville, FL (US); Youngwook Noh, Gainesville, FL (US); Richard T. Farley, Gainesville, FL (US)

(73) Assignee: NANOPTICS, INCORPORATED, Gainesville, FL (US)

(*) Notice: Subject to any disclaimer, the term of this patent is extended or adjusted under 35 U.S.C. 154(b) by 259 days.

This patent is subject to a terminal disclaimer.

(21) Appl. No.: 15/602,573

(22) Filed: May 23, 2017

(65) Prior Publication Data

US 2017/0313935 A1  Nov. 2, 2017

Related U.S. Application Data

(63) Continuation of application No. 14/533,991, filed on Nov. 5, 2014, now Pat. No. 9,657,220.

(60) Provisional application No. 61/900,200, filed on Nov. 5, 2013.

(51) Int. Cl.
  *C09K 11/02* (2006.01)
  *G01T 1/203* (2006.01)
  *G21K 4/00* (2006.01)
  *C09K 11/06* (2006.01)

(52) U.S. Cl.
  CPC .............. *C09K 11/02* (2013.01); *C09K 11/06* (2013.01); *G01T 1/2033* (2013.01); *G21K 4/00* (2013.01)

(58) Field of Classification Search
  CPC ........ C09K 11/02; C09K 11/06; G01T 1/2033
  See application file for complete search history.

(56) References Cited

U.S. PATENT DOCUMENTS

| 4,594,179 A | 6/1986 | Harrah et al. |
| 4,657,696 A | 4/1987 | Thomson |
| 5,606,638 A | 2/1997 | Tymianski et al. |
| 9,657,220 B2 * | 5/2017 | Walker .................. C09K 11/02 |

FOREIGN PATENT DOCUMENTS

| EP | 0 606 732 | 7/1994 |
| EP | 0 691 549 | 1/1996 |
| WO | WO-2012/135140 | 10/2012 |
| WO | WO-2014/107215 | 7/2014 |

\* cited by examiner

*Primary Examiner* — C Melissa Koslow
(74) *Attorney, Agent, or Firm* — Saliwanchik, Lloyd & Eisenschenk (57) ABSTRACT

Embodiments of the subject invention relate to high efficiency plastic scintillators that emit intense light when exposed to ionizing radiation. Specific embodiments of the subject invention pertain to material compositions for providing high-intensity, scintillation light output in the presence of ions, which can be used for making scintillators more sensitive to the presence of ionizing radiation.

25 Claims, 2 Drawing Sheets

SCINTILLATING MATERIAL COMPOSITION TO PROVIDE HIGH LIGHT OUTPUT

CROSS-REFERENCE TO RELATED APPLICATION

The present application is a continuation application of U.S. patent application Ser. No. 14/533,991, filed Nov. 5, 2014 (now U.S. Pat. No. 9,657,220), which claims the benefit of U.S. Provisional Application Ser. No. 61/900,200, filed Nov. 5, 2013, all of which are hereby incorporated by reference herein in their entirety, including any figures, tables, or drawings.

BACKGROUND OF INVENTION

Conventional scintillators have been developed for detection of high energy particles and radiation, such as x-rays, gamma-rays, neutrons, and the like. A scintillation detecting system is based on the use of a scintillation composition to convert a portion of the energy imparted to the composition by incident ionizing radiation, to light, such as visible or ultra-violet scintillation light. Absolute scintillation (or conversion) efficiency of a composition is defined as the ratio of the energy carried by the visible or ultra-violet light, to the energy lost in the composition by the incident ionizing radiation. The light emerging from a scintillator typically impinges upon some photo-electric device, e.g., a photomultiplier (PM), or charge coupled device (CCD), where it is converted into an electrical pulse. This electrical pulse is then amplified and recorded by a standard electronic data acquisition system. Details of scintillators, in general, and plastic organic scintillators, in particular, are described in publications such as the books by J. B. Birks, "The Theory and Practice of Scintillation Counting", Pergamon Press, (1964), and by G. F. Knoll, "Radiation Detection and Measurement", J. Wiley and Sons 1989 particularly Chapter 8. Plastic scintillators may be a solid sheet or plate or may be in the form of an optical fiber or fiber optic plate such as disclosed in European Patent Publication 0 606 732 A1, Jul. 20, 1994.

Conventional plastic scintillators (ternary scintillator) typically have three components, such as a polymeric matrix, e.g., poly(vinyltoluene) (PVT), and two fluors (fluorescent compounds). The typical scintillator composition of the two fluors is a primary dye, e.g., para-terphenyl (PTP), and a secondary dye, e.g., diphenylstilbene (DPS), at concentrations of about 1% and 0.02% wt./wt., respectively. Such a scintillator material is haze free, optically transparent, solid and stable. Methods of making and using such conventional plastic scintillators are disclosed in Harrah et al., U.S. Pat. No. 4,594,179. It has been observed that the light output from the conventional scintillator does not increase as the PTP concentration is increased above 1% wt./wt. This phenomenon has been described as "concentration quenching", and is caused by several underlying physical mechanisms.

Generally, a high absolute scintillation efficiency of a scintillator composition is desirable to achieve high detection sensitivity of ionizing radiation. Scintillation efficiency is a function of several parameters, including the type of solid matrix and the type of fluors employed. Typically, light output relative to anthracene is less than 70% for plastic and the absolute scintillation efficiencies is less than about 4%. Since modern scintillator solute fluors typically have fluorescent quantum efficiencies of close to 100%, a substantial increase in plastic composition scintillation efficiency by alternative choices of fluors is unlikely. For this reason, the light output from commercial plastic scintillator has remained at less than 70% of the light output from anthracene for more than 60 years.

Attempts have been made to increase scintillation efficiency of plastic scintillators by using other plastic matrixes such as polyvinylxylene, polyisopropyl styrene, and polyvinyl naphthalene, and copolymers of monomers represented in polymers listed above. Such attempts have resulted in increasing the scintillation efficiency by up to about 40%. Such approaches suffer from one or more disadvantages, such as the monomers or polymers are commercially unavailable or prohibitively expensive, or polymer compositions are brittle and subject to surface crazing or deterioration. For these reasons, none of these approaches has been pursued commercially.

Addition of naphthalene to conventional plastic scintillators has been explored as a way to increase the scintillation efficiency. Brown, et al. (Nuclear Electronics 1, 15, 1959) added naphthalene to solid plastic scintillators, where polystyrene (PS) and polymethylmethacrylate (PMMA) were used as matrices. Addition of less than about 3% by weight of naphthalene to a PS mixture containing the fluor 2,5-diphenyl oxazole (PPO), did not change maximum scintillation efficiency of the mixture. When about 10% by weight of naphthalene is added to PMMA, this polymer is transformed from an extremely inefficient matrix to one with about 50% of the scintillation efficiency of PS.

J. Tymianski and J. K. Walker, U.S. Pat. No. 5,606,638, used polystyrene with 15% by weight of the following fluorescent aromatic compounds: dimethylnaphthalene, acenaphthene, and fluorene. In each case a fluorescent dye, tetraphenylbutadiene (TPB), was added at 1% weight. The purpose of the TPB was to absorb energy from the excited aromatic compound and from polystyrene and provide subsequent emission of scintillation light at about 420 nm. The relative scintillation emission output of these scintillating compositions compared to a composition containing only TPB were found to be as follows: Dimethylnaphthalene 1.51; Acenaphthene 1.49; and Fluorene 1.47. In each scintillator, there is a substantial and almost equal increase in scintillating light emission. Taking into account the fact that the quantum yields of the three aromatic compounds are 0.22, 0.6, and 0.8, respectively, it suggests that there is severe self-quenching of these dyes especially in the latter two cases.

Although many efforts have been made to produce more efficient plastic scintillator material, there still exists a need to produce plastic scintillator with light output relative to anthracene of at least 125%, preferably greater than 150%, and most preferably greater than 175%.

BRIEF SUMMARY

Embodiments of the subject invention relate to high efficiency plastic scintillators that emit intense light when exposed to ionizing radiation. Specific embodiments of the subject invention pertain to material compositions for providing high-intensity, scintillation light output in the presence of ions, which can be used for making scintillators more sensitive to the presence of ionizing radiation.

Embodiments of the subject invention are directed to a method of detecting ionizing radiation, a much brighter scintillation material, and a scintillator system.

An embodiment of the subject scintillator material composition, which can be referred to as a quaternary scintillator because it has four components, for converting the incident penetrating radiation to light (such as visible light), incorporates:

1) an amorphous polymeric matrix material;

2) a base dye dissolved in the amorphous polymeric matrix material, where the base dye incorporates a base fluorescent aromatic compound. In an embodiment, the base fluorescent aromatic compound has at least two rings. In an embodiment, the base fluorescent aromatic compound is an alkyl, aryl, phenyl, alkyl and aryl, alkyl and phenyl, aryl and phenyl, or alkyl, aryl, and phenyl substituted compound, optionally containing at least two rings. In an embodiment, the fluorescent aromatic compound is present at about 5 percent, greater than 5 percent, greater than 6, 10, 15, 20, 25, 30, and 35 percent, and/or in the range 5-10, 10-15, 15-20, 20-25, 25-30, and/or 30-35 percent, or greater than 35% of the scintillator material weight. In a preferred embodiment, the fluorescent aromatic compound is a bridged two ring compound with planar structure, high quantum efficiency, high solubility, and an emission spectrum with peak at about the same as the polymeric matrix, such as with a peak wavelength within 30%, 20%, 15%, 10%, 9%, 8%, 7%, 6%, 5%, 4%, 3%, 2%, and/or 1% of the peak wavelength of the amorphous polymeric matrix material;

3) a primary dye dissolved in the amorphous polymeric matrix material. In an embodiment the primary dye can have a concentration of less than 0.5%, in the range 0.25 to 0.5%, 0.5 to 1%, 1 to 1.5%, 1.5 to 2%, 2 to 2.5%, 2.5 to 3%, 3 to 3.5%, 3.5 to 4%, 4 to 4.5%, 4.5 to 5%, 5 to 5.5%, 5.5 to 6%, 0.25 to 6%, 0.5-6%, 0.5 to 3%, 0.25 to 3.5%, and/or greater than 6% of the scintillator material weight. Preferably, the primary dye dissolved in the amorphous polymeric matrix material efficiently transfers energy non-radiatively to itself from both the matrix and the base dye, such as the scintillation composition having an efficiency of at least 40, 50, 60, 70, 80, 90, 95, and/or 99% for transferring energy non-radiatively to the primary dye from the base dye. In embodiments, the primary dye incorporates a primary fluorescent aromatic compound. In an embodiment, the primary fluorescent aromatic compound has at least two rings. In an embodiment, the primary fluorescent aromatic compound is an alkyl, aryl, phenyl, alkyl and aryl, alkyl and phenyl, aryl and phenyl, or alkyl, aryl, and phenyl substituted compound, optionally containing at least two rings; and 4) a secondary dye dissolved in the amorphous polymeric matrix material. In embodiments, the secondary dye can have a concentration of less than 0.005%, 0.0025 to 0.005%, 0.005 to 0.01%, 0.01 to 0.015%, 0.015 to 0.02%, 0.02 to 0.025%, 0.025 to 0.03%, 0.03 to 0.035%, 0.035 to 0.04%, 0.04 to 0.045%, 0.045 to 0.05%, 0.05 to 0.055%, 0.005 to 0.05%, 0.005 to about 0.05%, and/or greater than 0.05% of the scintillator material weight. In embodiments, the secondary dye incorporates a secondary fluorescent aromatic compound. In an embodiment, the secondary fluorescent aromatic compound has at least two rings. In an embodiment, the secondary fluorescent aromatic compound is an alkyl, aryl, phenyl, alkyl and aryl, alkyl and phenyl, aryl and phenyl, or alkyl, aryl, and phenyl substituted compound, optionally containing at least two rings. In embodiments, the secondary dye absorbs fluorescence from the primary dye and reemits fluorescence. In specific embodiments, the fluorescence reemitted by the secondary dye is in the visible region of wavelengths.

The scintillation composition results when the amorphous polymeric matrix material with the base dye, primary dye, and secondary due dissolved therein is polymerized.

In a further embodiment of this invention, the amorphous polymeric matrix material and base dye are employed as above, together with a single dye replacing the primary dye and the secondary dye. This single replacement dye can be designed to have a very large Stokes shift, which shifts the light into the visible range with very little light reabsorption.

In a specific embodiment of the invention, the polymeric matrix is cross-linked.

In another embodiment of the invention the quaternary scintillator is a liquid, incorporating:

1) an aromatic solvent, such as pseudocumene, xylene or the like;

2) a base dye dissolved in the aromatic solvent. In an embodiment, the base dye incorporates a base fluorescent aromatic compound. In an embodiment, the fluorescent aromatic compound is an alkyl, aryl, phenyl, alkyl and aryl, alkyl and phenyl, aryl and phenyl, or alkyl, aryl, and phenyl substituted compound, optionally containing at least two rings. In an embodiment, the fluorescent aromatic compound is present at about 5 percent, greater than 5 percent, greater than 6, 7, 10, 15, 20, 25, 30, 35 percent, and/or in the range 5-10%, 10-15%, 15-20%, 20-25%, 25-30%, and/or 30-35%, or greater than 35% of the scintillator material weight. In a preferred embodiment, the fluorescent aromatic compound is a bridged two ring compound with planar structure, high quantum efficiency, high solubility, and an emission spectrum with peak at about the same as the aromatic solvent, such as with a peak wavelength within 30%, 20%, 15%, 10%, 9%, 8%, 7%, 6%, 5%, 4%, 3%, 2%, and/or 1% of the peak wavelength of the aromatic solvent;

3) a primary dye dissolved in the aromatic solvent. In an embodiment, the primary dye can have a concentration of less than 0.5%, in the range 0.25 to 0.5%, 0.5 to 1%, 1 to 1.5%, 1.5 to 2%, 2 to 2.5%, 2.5 to 3%, 3 to 3.5%, 3.5 to 4%, 4 to 4.5%, 4.5 to 5%, 5 to 5.5%, 5.5 to 6%, 0.25 to 6%, 0.5 to 6%, 0.5 to 3%, 0.25 to 3.5%, and/or greater than 6% of the scintillator material weight. Preferably, the primary dye dissolved in the amorphous polymeric matrix material efficiently transfers energy non-radiatively to itself from both the matrix and the base dye, such as the scintillation composition having an efficiency of at least 40%, 50%, 60%, 70%, 80%, 90%, 95%, and/or 99% for transferring energy non-radiatively to the primary dye from the base dye. In an embodiment, the primary dye incorporates a primary fluorescent aromatic compound. In an embodiment, the primary fluorescent aromatic compound has at least two rings. In an embodiment, the primary fluorescent aromatic compound is an alkyl, aryl, phenyl, alkyl and aryl, alkyl and phenyl, aryl and phenyl, or alkyl, aryl, and phenyl substituted compound, optionally containing at least two rings; and 4) a secondary dye dissolved in the aromatic solvent. In an embodiment, the secondary dye can have a concentration of less than 0.005%, 0.0025 to 0.005%, 0.005 to 0.01%, 0.01 to 0.015%, 0.015 to 0.02%, 0.02 to 0.025%, 0.025 to 0.03%, 0.03 to 0.035%, 0.035 to 0.04%, 0.04 to 0.045%, 0.045 to 0.05%, 0.05 to 0.055%, 0.005 to 0.05%, 0.005 to about 0.05%, and/or greater than 0.05% of the scintillator material weight. In embodiments, the secondary dye incorporates a secondary fluorescent aromatic compound. In an embodiment, the secondary fluorescent aromatic compound has at least two rings. In an embodiment, the secondary fluorescent aromatic compound is an alkyl, aryl, phenyl, alkyl and aryl, alkyl and phenyl, aryl and phenyl, or alkyl, aryl, and phenyl substituted compound, optionally containing at least two rings. In embodiments, the secondary dye absorbs fluorescence from the primary dye and reemits fluorescence. In specific embodiments, the fluorescence reemitted by the secondary dye is in the visible region of wavelengths.

In a further embodiment of the invention, the quaternary plastic and liquid scintillators can be used to provide pulse shape discrimination (PSD) for identifying fast neutrons in a background of gamma rays. Embodiments of the subject invention incorporate methods, systems, and/or materials taught by PCT/US2012/030606 (WO 2012/135140), published on Oct. 4, 2012, which is incorporated herein in its entirety, such as:
- A. a scintillation system for detecting incident radiation, incorporating:
  - a scintillator composition for converting incident radiation to scintillation light wherein the scintillator composition comprises:
  - a matrix material with a plurality of base fluorescent dye molecules dissolved therein, wherein the matrix material is a solid organic material, wherein the matrix material with the plurality of base fluorescent dye molecules dissolved therein comprises a plurality of chromophores, wherein the plurality of chromophores have a chromophore average nearest neighbor distance in the range 0.5 to 12 Angstroms;
  - wherein the plurality of chromophores produces the scintillation light upon excitation;
  - wherein the scintillation light has a prompt time component and a delayed time component, wherein the prompt time component and the delayed time component provide information so as to allow distinguishing between scintillation light created by neutrons and scintillation light created by gamma rays;
- B. a method for detecting incident radiation, incorporating:
  - positioning a scintillation system in a region of interest, wherein the scintillation system comprises:
    - a scintillator composition for converting the incident radiation to scintillation light wherein the scintillator composition comprises:
    - a matrix material, wherein the matrix material is a solid organic material, wherein the matrix material comprises chromophores, wherein the chromophores have an average nearest neighbor distance in the range of 0.5 to 12 Angstroms;
    - wherein the chromophores produce the scintillation light upon excitation;
    - wherein the prompt time component and the delayed time component provide information so as to allow distinguishing between scintillation light created by neutrons and scintillation light created by gamma rays;
    - receiving the scintillation light; and
    - determining from the received scintillation light whether neutrons were incident on the scintillation system; and
- C. a scintillator composition for converting the incident radiation to scintillation light, comprising:
  - a matrix material with a plurality of base fluorescent dye molecules dissolved therein, wherein the matrix material is a solid organic material, wherein the matrix material with the plurality of base fluorescent dye molecules dissolved therein comprises a plurality of chromophores, wherein the plurality of chromophores have a chromophore average nearest neighbor distance in the range 0.5 to 12 Angstroms;
  - wherein the plurality of chromophores produces the scintillation light upon excitation;
  - wherein the scintillation light has a prompt time component and a delayed time component, wherein the prompt time component and the delayed time component provide information so as to allow distinguishing between scintillation light created by neutrons and scintillation light created by gamma rays.

In another embodiment of the invention, the quaternary plastic and liquid scintillators can be used to provide pulse shape discrimination (PSD) for identifying thermal neutron capture by Lithium-6 in a background of gamma rays. Embodiments of the subject invention incorporate methods, systems, and/or materials taught by PCT/US2013/065307, filed on Oct. 16, 2013, which is incorporated herein in its entirety, such as:
- D. a scintillation system for detecting incident radiation, comprising:
  - a scintillation composition, wherein the scintillation composition comprises:
  - a matrix material; and
  - chromophore dye molecules dissolved in the matrix material, wherein the chromophore dye molecules self-assemble to form dimeric chromophores, wherein a concentration of the dimeric chromophores is such that the dimeric chromophores have an average nearest neighbor distance in the range 2 to 15 Angstroms,
  - wherein the dimeric chromophores produce excimer scintillation light upon excitation,
  - wherein the excimer scintillation light has a prompt component and a delayed component, wherein the delayed time component is excimer scintillation light that is produced a delay period of time after excimer scintillation light of the prompt component is produced,
  - wherein an intensity of the prompt component and an intensity of the delayed component provide information so as to allow distinguishing between excimer scintillation light created by a fast neutron being incident on the scintillation composition and excimer scintillation light created by a gamma ray being incident on the scintillation composition;
- E. a scintillation system for detecting incident radiation, comprising:
  - a scintillation composition, wherein the scintillation composition comprises:
  - a matrix material; and
  - chromophore dye molecules dissolved in the matrix material, wherein the chromophore dye molecules self-assemble to form dimeric chromophores, wherein a concentration of the dimeric chromophores is such that the dimeric chromophores have an average nearest neighbor distance in the range 2 to 15 Angstroms,
  - wherein the dimeric chromophores produce excimer scintillation light upon excitation,
  - wherein the excimer scintillation light has a prompt component,
  - wherein the prompt component comprises a first prompt sub component and a second prompt subcomponent, wherein the second prompt subcomponent is produced a second delay period of time after the first prompt subcomponent, wherein the second delay period of time is in the range 0.3 to 3 ns,
  - wherein an intensity of the first prompt subcomponent and an intensity of the second prompt subcomponent provide information so as to allow distinguishing between excimer scintillation light created by a fast neutron being incident on the scintillation composition and excimer scintillation light created by a gamma ray being incident on the scintillation composition;

F. a scintillation system, comprising:
a matrix material; and
isotope Li-6,
wherein the system provides information for identifying nuclear fragments resulting from thermal neutron capture by isotope Li-6 and discriminate with a factor of at least 100,000:1 against electron recoils from gamma ray scatters in the matrix material;
G. a scintillation system, comprising:
a matrix material; and
isotope Li-6,
wherein the system provides information for identifying nuclear fragments resulting from thermal neutron capture by isotope Li-6 and discriminates with a factor of at least 10,000:1 and/or 100,000:1 against electron recoils from gamma ray scatters in the matrix material;
H. a scintillation system, comprising:
a matrix material; and
isotope B-10,
wherein the system provides information for identifying nuclear fragments resulting from thermal neutron capture by isotope B-10 and discriminates with a factor of at least 100,000:1 against electron recoils from gamma ray scatters in the matrix material; and
I. a scintillation system, wherein the system provides information to identify recoil protons over a range of energies from fast neutron scatters in the matrix material, identify nuclear fragments resulting from thermal neutron capture within the matrix material, and discriminate with a factor of at least 1,000:1 and/or 100,000:1 against electron recoils from gamma ray scatters in the matrix material.

DETAILED DISCLOSURE

Figure 1:
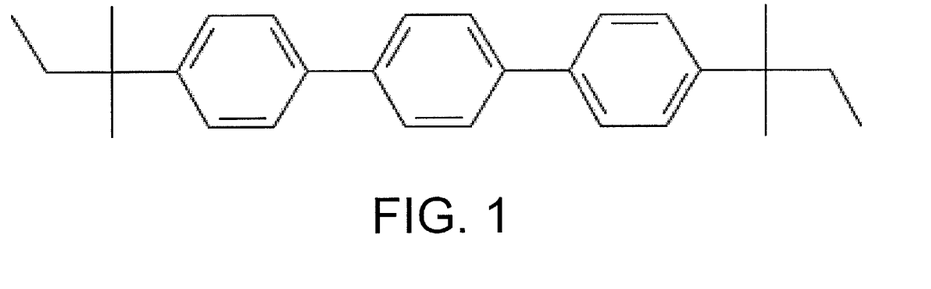
FIG. 1 shows the structure of di-t-pentyl-p-terphenyl.

The conventional plastic scintillator, which has been used for sixty years has been termed ternary because it is composed of three components, namely a polymer, a primary dye at about 1% wt./wt., and a secondary dye at a concentration of about 0.02% wt./wt. The mechanism producing concentration quenching of the primary dye at 1% wt./wt. has been investigated. Embodiments of the subject invention can employ a substituted form of the standard primary dye, PTP. The dye, di-t-pentyl-p-terphenyl can be synthesized and incorporated in samples of a conventional plastic scintillator. A primary dye structure, as shown in FIG. 1, can be used, where the compound has a maximum solubility of 6% in polystyrene (PS).

Figure 2:
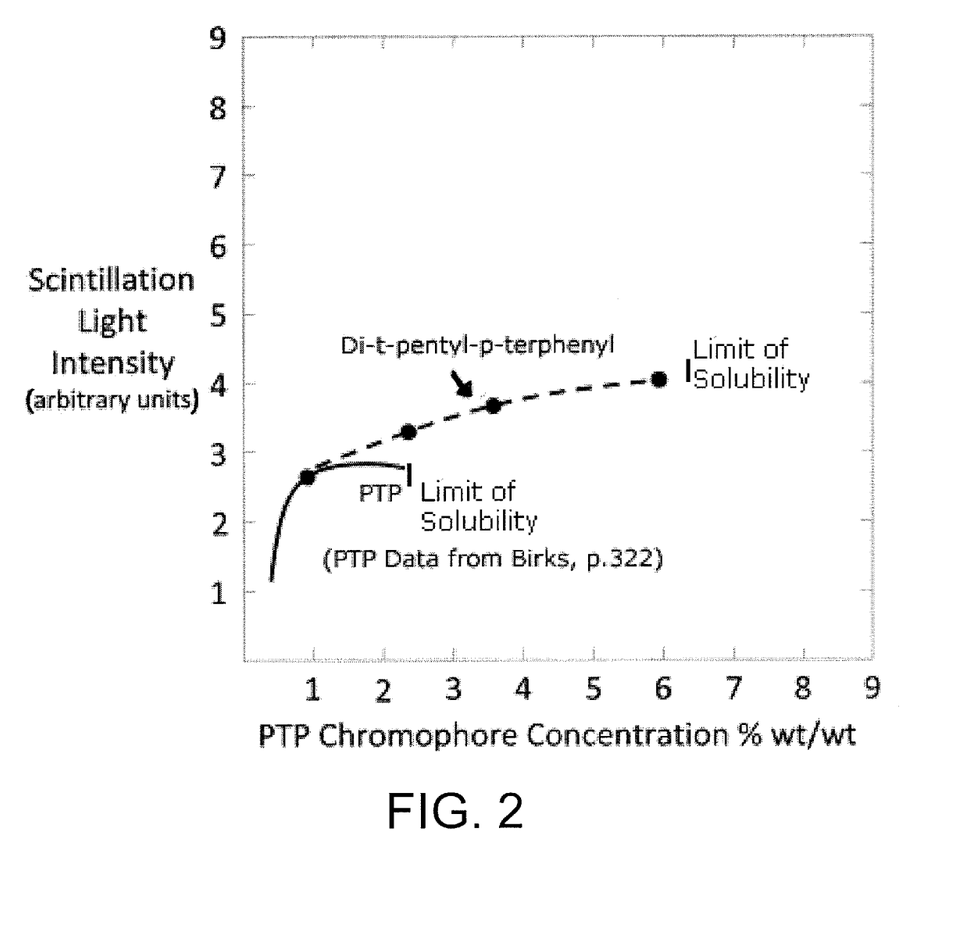
FIG. 2 shows the light output vs. primary dye concentration of di-t-pentyl-p-terphenyl in a ternary plastic scintillator.

The measured data on light output versus concentration of di-t-pentyl-p-terphenyl is shown in FIG. 2. The data shows experimentally that "concentration-quenching" can be substantially reduced in this iconic case. The light output continues to increase beyond the conventional maximum at 1% wt./wt. up to the solubility limit at about 6% wt./wt. The total light output increase is about 35%, or 40%.

This result can be attributed to an excited state of the di-t-pentyl-p-terphenyl molecule having less chance of being quenched by another di-t-pentyl-p-terphenyl molecule, because the chromophores are kept sufficiently apart by the substituents to preventing quenching. Despite achieving a 35%, or 40%, increase in light output, it is difficult to reach the desired scintillator efficiencies with a ternary scintillating structure.

Embodiments of a quaternary polystyrene scintillator containing naphthalene with diisopropyl substituents were produced and the scintillation light output measured. Embodiments can incorporate materials and methods from J. Thomson, U.S. Pat. No. 4,657,696, which is hereby incorporated by reference in its entirety, where Thomson introduces a mixed isomer form of diisopropylnaphthalene (DIN) as a base liquid dye for liquid scintillator, to achieve a reduced quenching of scintillation light, and the same can be incorporated with embodiments of the subject invention.

Embodiments can incorporate scintillating plastic materials, containing increasing concentrations of DIN, from 0-5%, 5-10%, and/or 10-15%, 15-20%, 20%-25%, 25-30%, 30-35%, and/or greater than 35%. The primary and secondary dyes, such as PTP and POPOP at concentration of 1% and 0.02% wt/wt, respectively, can be incorporated. The measured light output for specific embodiments incorporating DIN of 0%, 5%, 10%, or 15% wt/wt, primary dye PTP of 1% wt/wt, and secondary dye POPOP of 0.02% wt/wt is shown in FIG. 3.

A comparison can be made between the previously reported Tymianski and Walker measurement of 51% light increase using dimethylnaphthalene with the above result of 95% light increase using diisopropylnaphthalene at fixed concentration of 15% wt./wt. It appears that the more bulky isopropyl substituents have reduced the self-quenching of the excited states of the naphthalene chromophore, in accordance with embodiments of the subject invention.

Figure 3:
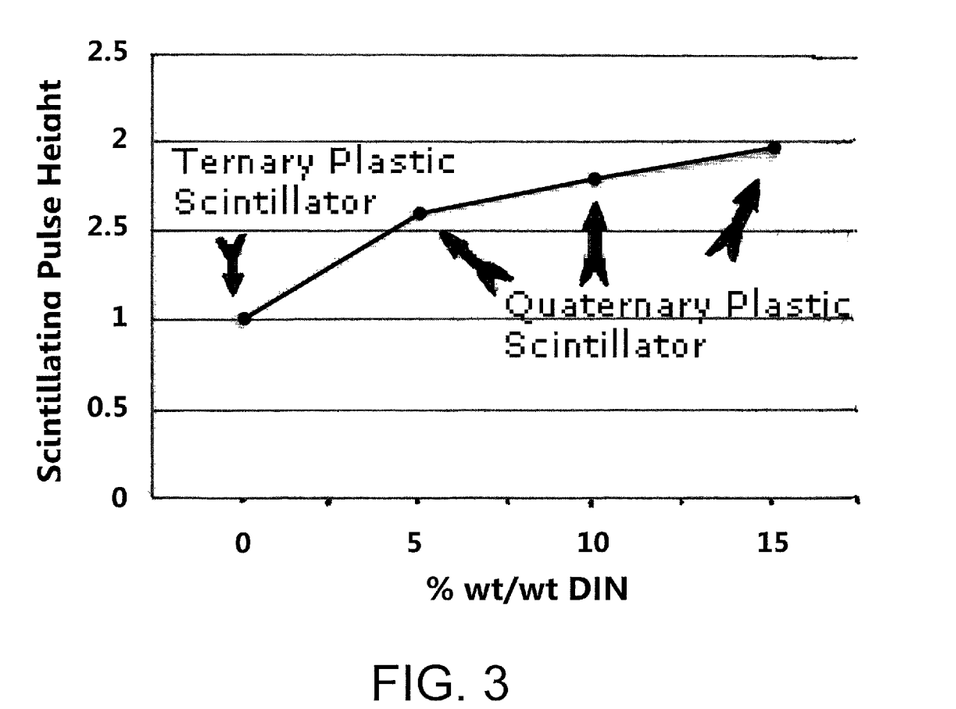
FIG. 3 shows the light output dependence on base dye concentration of diisopropylnaphthalene.

In FIG. 3 it can be seen that the light output from a four component, quaternary, plastic scintillator, in accordance with the subject invention, has been shown to increase by almost a factor of 2 for high concentration of a quench resistant substituted base dye. This corresponds to a plastic scintillator with 140% of the light output of anthracene.

It is desirable to achieve high light output with a low concentration of base dye, and preferably the minimum concentration of base dye needed for the desired light output, as a high concentration of an additive in the form of base dye reduces the glass transition temperature of the polymeric matrix and lowers the maximum operating temperature of the material.

Embodiments relate to a high efficiency scintillator material having acceptable mechanical and thermal properties. Based on the total weight of the scintillator material, embodiments of the subject scintillator material contain about 5%, at least 5%, at least 6%, and/or at least 10% by weight, or more, of a bridged aromatic fluorescent compound. Aromatic compounds that can be utilized include, but are not limited to, bridged biphenyl and naphthalene. Table 1 shows examples of such compounds and some of their properties.

TABLE 1

Base Chromophores for Quaternary Plastic Scintillator.

| Candidate Base Dye Fluorophores | Fluorene | 9,10-Dihydrophenanthrene | Dibenzofuran | Acenaphthene |
|---|---|---|---|---|
| Structure |  |  |  |  |
| Quantum Yield | 0.8 | 0.55 | 0.53 | 0.6 |
| Fluorescence Lifetime (ns) | 10 | 6.6 | 7.3 | 46 |
| Stokes Loss (Cm$^{-1}$) | 1430 | 2000 | 1900 | 1600 |
| Emission Average Wavelength (nm) | 313 | 322 | 318 | 310 |
| Melting Point (° C.) | 111 | 30 | 81 | 106 |
| Measured Maximum Solubility % wt/wt in Styrene at 25° C. | 30% | expected >40% | expected 35% | 30% |
| Cost per Gram | 50¢ | $1 | $2 | 48¢ |

Importantly, these base dyes have planar structures, high quantum efficiencies, emission fluorescence maxima at the emission maxima of polystyrene and polyvinyl toluene, very high solubility, and are all commercially available.

In order to reduce, and preferably minimize, self-quenching, in order to achieve high light output, the dyes can be provided with substituents. Many such compounds are also commercially available. To illustrate how the dyes can be provided with substituents, chromophore fluorene, which has the highest quantum yield of the group and is an attractive potential base chromophore, is used as an example. Table 2 shows some commercially available substituted forms of fluorene.

It should be emphasized that the photo-physical properties of the 9-C substituted fluorene compounds are essentially unaffected by substitutions because of the planar rigidity of the chromophore and symmetry of the unique location (9-C) of substituents. Of course, larger and more bulky substituent groups can be made to further enhance the resistance to self-quenching of the excited chromophores.

The other base dyes in Table 2 have similar characteristics. There are commercially available substituted compounds based on these chromophores that can be utilized in accordance with various embodiments.

Embodiments of the subject plastic scintillator, which can be much brighter than previous plastic scintillators, can be

TABLE 2

A few Commercially Available Substituted Fluorene Compounds.

| Compound Name | Structure | Formula Weight | Melting Point ° C. |
|---|---|---|---|
| 9-Fluorenylmethanol |  | 196 | 105 |
| 9-Fluorene-9,9 Dimethanol |  | 226 | 142 |
| 9-Fluorenecarboxaldehy dediethyl acetal |  | 268 | 96 | used in applications, such as the hadron collider calorimeters, employing hundreds of thousands of very small, thin, scintillating plates, and can, in addition, provide superior pulse shape discrimination for neutron detection for materials analysis, Nuclear Non-Proliferation, Nuclear Security, and Homeland Security. In these applications, neutron discrimination against gamma rays is limited by the light output intensity in the tail of the scintillation pulse. For these reasons, embodiments of the subject scintillating material, which can be much brighter than previous scintillating material, can be an enabling technology for many applications.

EMBODIMENTS

Embodiment 1

A Scintillation System, Comprising:
a scintillation composition,
wherein the scintillation composition comprises:
an amorphous polymeric matrix material;
a base dye dissolved in the amorphous polymeric matrix material,
wherein the base dye incorporates a base fluorescent aromatic compound, and
wherein the base fluorescent aromatic compound is at least 5% wt/wt of the scintillation composition; and
a primary dye dissolved in the amorphous polymeric matrix material,
wherein the primary dye is at least 0.25% wt/wt of the scintillation composition, and
wherein when ionizing radiation is incident on the scintillation composition, the primary dye emits primary fluorescence.

Embodiment 2

The scintillation system according to Embodiment 1, further comprising:
a secondary dye dissolved in the amorphous polymeric matrix material,
wherein the secondary dye is at least 0.005% wt/wt of the scintillation composition, and
wherein primary fluorescence emitted by the primary dye is absorbed by the secondary dye such that the secondary dye emits secondary fluorescence.

Embodiment 3

The scintillation system according to Embodiment 1,
wherein the base fluorescent aromatic compound has at least two rings.

Embodiment 4

The scintillation system according to Embodiment 1,
wherein the base fluorescent aromatic compound is an alkyl, aryl, or phenyl substituted compound.

Embodiment 5

The scintillation system according to Embodiment 1,
wherein the base fluorescent aromatic compound is an alkyl and aryl substituted compound.

Embodiment 6

The scintillation system according to Embodiment 1,
wherein the primary dye comprises a primary fluorescent aromatic compound.

Embodiment 7

The scintillation system according to Embodiment 1,
wherein the base fluorescent aromatic compound is a bridged at least two ring compound
with a planar structure.

Embodiment 8

The scintillation system according to Embodiment 1,
wherein the primary dye incorporates a primary fluorescent aromatic compound, and
wherein the primary fluorescent aromatic compound is in the range 0.25 to 6% wt/wt of the scintillation composition.

Embodiment 9

The scintillation system according to Embodiment 1,
wherein the scintillation composition has an efficiency of transferring energy non-radiatively to the primary dye from the base dye of at least 40%.

Embodiment 10

The scintillation system according to Embodiment 2,
wherein the secondary dye is in the range 0.005 to 0.05% of the scintillation composition.

Embodiment 11

The scintillation system according to Embodiment 10,
wherein at least a portion of the secondary fluorescence is visible.

Embodiment 12

The scintillation system according to Embodiment 1,
wherein at least a portion of the primary fluorescence is visible.

Embodiment 13

The scintillation system according to Embodiment 1,
wherein the amorphous polymeric matrix material is cross-linked.

Embodiment 14

The scintillation system according to Embodiment 1,
wherein the base fluorescent aromatic compound is at least 15% wt/wt of the scintillation composition.

Embodiment 15

The scintillation system according to Embodiment 1,
wherein the scintillation composition has an efficiency of transferring energy non-radiatively to the primary dye from the base dye of at least 60%.

Embodiment 16

A scintillation system, comprising:
a scintillation composition,
wherein the scintillation composition comprises:
an aromatic solvent;
a base dye dissolved in the aromatic solvent;

wherein the base dye incorporates a base fluorescent aromatic compound, and
wherein the base fluorescent aromatic compound is at least 5% wt/wt of the scintillation composition; and
a primary dye dissolved in the aromatic solvent,
wherein the primary dye is at least 0.25% wt/wt of the scintillation composition, and
wherein when ionizing radiation is incident on the scintillation composition, the primary dye emits primary fluorescence.

Embodiment 17

The scintillation system according to Embodiment 16, further comprising:
a secondary dye dissolved in the aromatic solvent,
wherein the secondary dye is at least 0.0025% wt/wt of the scintillation composition, and
wherein the secondary dye absorbs the primary fluorescence from the primary dye and emits secondary fluorescence.

Embodiment 18

The scintillation system according to Embodiment 16, wherein the aromatic solvent is pseudocumene or xylene.

Embodiment 19

The scintillation system according to Embodiment 16, wherein the base fluorescent aromatic compound has at least two rings.

Embodiment 20

The scintillation system according to Embodiment 16, wherein the base fluorescent aromatic compound is an alkyl, aryl, or phenyl substituted compound.

Embodiment 21

The scintillation system according to Embodiment 16, wherein the base fluorescent aromatic compound is an alkyl and aryl substituted compound containing at least two rings.

Embodiment 22

The scintillation system according to Embodiment 16, wherein the base fluorescent aromatic compound is at least 15% wt/wt of the scintillation composition.

Embodiment 23

The scintillation system according to Embodiment 16, wherein the base fluorescent aromatic compound is a bridged at least two ring compound with a planar structure.

Embodiment 24

The scintillation system according to Embodiment 16, wherein the base dye is a mixed isomer form of diisopropylnaphthalene.

Embodiment 25

The scintillation system according to Embodiment 24, wherein the primary dye is PTP, and
wherein the secondary dye is POPOP.

Embodiment 26

The scintillation system according to Embodiment 1, wherein the base dye is a mixed isomer form of diisopropylnaphthalene.

Embodiment 27

The scintillation system according to Embodiment 26, wherein the primary dye is PTP,
wherein the secondary dye is POPOP.

Embodiment 28

The scintillation system according to Embodiment 4, wherein the base fluorescent aromatic compound is an alkyl substituted compound, and
wherein the alkyl substituted compound is fluorenecarboxaldehyde diethyl acetal.

Embodiment 29

The scintillation system according to Embodiment 20, wherein the base fluorescent aromatic compound is an alkyl substituted compound, and
wherein the alkyl substituted compound is fluorenecarboxaldehyde diethyl acetal.

Embodiment 30

A scintillation system, comprising:
a polymeric matrix;
a primary dye dissolved in the polymeric matrix,
wherein the primary dye is di-t-pentyl-p-terphenyl, and
wherein when ionizing radiation is incident on the scintillation composition the primary dye emits primary fluorescence; and
a secondary dye dissolved in the polymeric matrix,
wherein the secondary dye absorbs the primary fluorescence and emits secondary fluorescence, and
wherein at least a portion of the secondary fluorescence is visible.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Aspects of the invention, such as receiving, processing, and outputting detection signals and indications, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A scintillation composition, comprising:
   an amorphous polymeric matrix material;
   a base dye dissolved in the amorphous polymeric matrix material,
   wherein the base dye incorporates a base fluorescent aromatic compound, and
   wherein the base fluorescent aromatic compound is at least 5% wt/wt of the scintillation composition; and
   a primary dye dissolved in the amorphous polymeric matrix material,
   wherein the primary dye is at least 0.25% wt/wt of the scintillation composition, and
   wherein when ionizing radiation is incident on the scintillation composition, the primary dye emits primary fluorescence.

2. The scintillation composition according to claim 1, further comprising:
   a secondary dye dissolved in the amorphous polymeric matrix material,
   wherein the secondary dye is at least 0.005% wt/wt of the scintillation composition, and
   wherein primary fluorescence emitted by the primary dye is absorbed by the secondary dye such that the secondary dye emits secondary fluorescence.

3. The scintillation system composition according to claim 2,
   wherein the secondary dye is in the range 0.005 to 0.05% of the scintillation composition.

4. The scintillation composition according to claim 3,
   wherein at least a portion of the secondary fluorescence is visible.

5. The scintillation composition according to claim 1,
   wherein the base fluorescent aromatic compound has at least two rings.

6. The scintillation composition according to claim 1,
   wherein the base fluorescent aromatic compound is an alkyl, aryl, or phenyl substituted compound.

7. The scintillation composition according to claim 1,
   wherein the base fluorescent aromatic compound is an alkyl and aryl substituted compound.

8. The scintillation composition according to claim 1,
   wherein the primary dye comprises a primary fluorescent aromatic compound.

9. The scintillation composition according to claim 1,
   wherein the base fluorescent aromatic compound is a bridged at least two ring compound with a planar structure.

10. The scintillation composition according to claim 1,
    wherein the primary dye incorporates a primary fluorescent aromatic compound, and
    wherein the primary fluorescent aromatic compound is in the range 0.25 to 6% wt/wt of the scintillation composition.

11. The scintillation composition according to claim 1,
    wherein the scintillation composition has an efficiency of transferring energy non-radiatively to the primary dye from the base dye of at least 40%.

12. The scintillation composition according to claim 1, wherein at least a portion of the primary fluorescence is visible.

13. The scintillation composition according to claim 1, wherein the amorphous polymeric matrix material is cross-linked.

14. The scintillation composition according to claim 1, wherein the base fluorescent aromatic compound is at least 15% wt/wt of the scintillation composition.

15. The scintillation composition according to claim 1, wherein the scintillation composition has an efficiency of transferring energy non-radiatively to the primary dye from the base dye of at least 60%.

16. A scintillation composition, comprising:
an aromatic solvent;
a base dye dissolved in the aromatic solvent,
wherein the base dye incorporates a base fluorescent aromatic compound, and
wherein the base fluorescent aromatic compound is at least 5% wt/wt of the scintillation composition; and
a primary dye dissolved in the aromatic solvent,
wherein the primary dye is at least 0.25% wt/wt of the scintillation composition,
wherein when ionizing radiation is incident on the scintillation composition, the
primary dye emits primary fluorescence, and
wherein:
(i) the base fluorescent aromatic compound is an alkyl and aryl substituted compound containing at least two rings;
(ii) the base fluorescent aromatic compound is a bridged at least two ring compound with a planar structure; or
(iii) the base fluorescent aromatic compound is an alkyl substituted compound.

17. The scintillation composition according to claim 16, further comprising:
a secondary dye dissolved in the aromatic solvent,
wherein the secondary dye is at least 0.0025% wt/wt of the scintillation composition, and
wherein the secondary dye absorbs the primary fluorescence from the primary dye and emits secondary fluorescence.

18. The scintillation composition according to claim 16, wherein the base fluorescent aromatic compound is at least 15% wt/wt of the scintillation composition.

19. The scintillation composition according to claim 16, wherein the base fluorescent aromatic compound is a bridged at least two ring compound with a planar structure.

20. The scintillation composition according to claim 19, wherein the base fluorescent aromatic compound is an alkyl, aryl, or phenyl substituted compound.

21. The scintillation composition according to claim 19, further comprising:
a secondary dye dissolved in the aromatic solvent,
wherein the secondary dye is at least 0.0025% wt/wt of the scintillation composition, and
wherein the secondary dye absorbs the primary fluorescence from the primary dye and emits secondary fluorescence.

22. The scintillation composition according to claim 16, wherein the base fluorescent aromatic compound is an alkyl and aryl substituted compound containing at least two rings.

23. The scintillation composition according to claim 16, wherein the alkyl substituted compound is fluorenecarboxaldehyde diethyl acetal.

24. The scintillation composition according to claim 23, further comprising:
a secondary dye dissolved in the aromatic solvent,
wherein the secondary dye is at least 0.0025% wt/wt of the scintillation composition, and
wherein the secondary dye absorbs the primary fluorescence from the primary dye and emits secondary fluorescence.

25. A scintillation composition, comprising:
a polymeric matrix;
a primary dye dissolved in the polymeric matrix,
wherein the primary dye is di-t-pentyl-p-terphenyl, and
wherein when ionizing radiation is incident on the scintillation composition the primary dye emits primary fluorescence; and
a secondary dye dissolved in the polymeric matrix,
wherein the secondary dye absorbs the primary fluorescence and emits secondary fluorescence, and
wherein at least a portion of the secondary fluorescence is visible.

* * * * *

UNITED STATES PATENT AND TRADEMARK OFFICE
CERTIFICATE OF CORRECTION

PATENT NO. : 10,662,373 B2
APPLICATION NO. : 15/602573
DATED : May 26, 2020
INVENTOR(S) : James K. Walker et al.

Page 1 of 1

It is certified that error appears in the above-identified patent and that said Letters Patent is hereby corrected as shown below:

In the Claims

Column 16,
Line 35, Claim 3 "scintillation system composition" should read -- scintillation composition --.

Signed and Sealed this
Third Day of November, 2020

Andrei Iancu
*Director of the United States Patent and Trademark Office*